United States Patent Office 3,553,161
Patented Jan. 5, 1971

3,553,161
POLYAMIDES STABILIZED AGAINST DEGRADATION WITH COPPER SALTS AND PHOSPHINE HALIDES
Karl Heinz Hermann, Krefeld-Bockum, August Böckmann, Krefeld, and Hans Rudolph, Krefeld-Bockum, Germany, assignors to Farbenfabriken Bayer Aktiengesellschaft, Leverkusen, Germany, a corporation of Germany
No Drawing. Filed June 11, 1968, Ser. No. 735,972
Claims priority, application Germany, June 19, 1967,
F 52,728
Int. Cl. C08g 51/60, 51/62
U.S. Cl. 260—45.75                                    2 Claims

ABSTRACT OF THE DISCLOSURE

Polyamides stabilized against degradation by heat and oxidative effects, containing as stabilizer a combination consisting of (a) a copper compound and (b) a tertiary phosphine dihalide of the general formula

wherein $R_1$, $R_2$ and $R_3$, which may be different or not, represent alkyl, cycloalkyl, aryl or aralkyl radicals or $R_1$ and $R_2$ together represent an alkylene radical and $R_3$ represents an alkyl, cycloalkyl, aryl or aralkyl radical, and X represents chlorine, bromine or iodine.

---

The invention relates to stabilised polyamides containing a combination of copper compounds and tertiary phosphine dihalides as stabilisers and to a process for their production.

Shaped articles made of polyamides that have been produced by polycondensation of diamines and dicarboxylic acids or of aminocarboxylic acids or by polymerisation of their lactams, for example filaments, bristles, foils, etc., are damaged by the action of air and oxygen, especially at elevated temperatures. This has the effect of reducing the relative viscosity and impairing the mechanical strength and stretching properties of the polyamide. At the same time, the polyamide becomes increasingly brown.

It is known to protect polyamides against such damage by air and oxygen at elevated temperatures by the addition of stabilisers. The following compounds, for example, have already been proposed as stabilisers: Manganese salts of inorganic and organic acids, copper salts of inorganic and organic acids, derivatives of oxyacids of phosphorus, aromatic amines and phenols. For preference combinations of these groups of compounds with each other, or with compounds which have no stabiliser effect on their own have also been used, e.g. with alkali metal halides, alkaline earth halides, iodine, arylsulfonic acids and mercapto benzimidazole.

The stabilisers previously used have the disadvantage that either their stabilising effect is not sufficient, for example, when Mn and Sn salts, phosphorous compounds, distannanes or phenols are used, or that they are sensitive to light, which causes discolouration of the polyamide in the course of time, for example when aromatic amines and phenols are used.

The addition of a combination of copper salts and halogen compounds such as iodine, alkali metal halides, alkaline earth halides, halides of difficultly volatile organic bases, phosphorous trihalides, phosphoroxyhalides or tin tetraiodide, which has an excellent stabiliser effect as such, also generally leads to discolouration of the polyamide.

Moreover, most of the halogen compounds previously used can be extracted with water so that their addition to polyamides which have to be freed from monomeric constituents by extraction with hot water, for example, polycaprolactam or copolyamides of caprolactam, cannot be carried out before this extraction. Addition after the extraction, however, necessitates an additional working step since the polyamide has to be melted again in order that it may be mixed homogeneously with the stabilisers. The fact that the halogen compound can be extracted is also disadvantageous when the stabilised polyamide is brought into contact with water or aqueous solutions. Furthermore, when phosphorous trihalides and phosphoroxyhalides are used, an uncontrollable increase in the melt viscosity of the polyamide may occur due to partial cross-linking or branching and this increase in the melt viscosity leads to difficulties in the working up processes, especially in the production of fibres.

It is an object of this invention to provide stabilised polyamides which do not show the disadvantages outlined above.

This object is accomplished by a polyamide, stabilised against degradation by heat and oxidative effects, containing as stabiliser a combination consisting of:

(a) a copper compound in such an amount that 0.0001 to 0.2% by weight, based on the polyamide, of copper are present and
(b) 0.001 to 5.0% by weight, based on the polyamide, of a tertiary phosphine dihalide of the general formula

wherein $R_1$, $R_2$ and $R_3$, which may be different or not, represent substituted or unsubstituted alkyl, cycloalkyl, aryl, or aralkyl radicals, or $R_1$ and $R_2$ together represent an alkylene radical and $R_3$ represents an alkyl, cycloalkyl, aryl or aralkyl radical, and X represents chorine, bromine, or iodine.

It is a further object of this invention to provide a process for the production of polyamides, stabilised against degradation by heat and oxidative effects, which comprises adding to the polyamides or to the polyamides forming starting materials a stabiliser combination consisting of:

(a) a copper compound and
(b) a tertiary phosphine dihalide of the general formula

wherein $R_1$, $R_2$ and $R_3$, which may be different or not, represent substituted or unsubstituted alkyl, cycloalkyl, aryl or aralkyl radicals, or $R_1$ and $R_2$ together represent an alkylene radical and $R_3$ represents a substituted or unsubstituted alkyl, cycloalkyl, aryl or aralkyl radical, and X represents Cl, Br or I.

The following are examples of tertiary phosphine dihalides which may be used according to the invention: the dichloride, dibromide and diiodide of tributylphosphine; the dichloride, dibromide and diiodide of tricyclohexylphosphine; the dichloride, dibromide and diiodide of triphenylphosphine; the dichloride, dibromide and diiodide of cyclohexyldiphenylphosphine; the dichloride, dibromide and diiodide of phenyldibutylphosphine; the dichloride, dibromide and diiodide of diphenylbenzylphosphine; the dichloride, dibromide and diiodide of tri-($\alpha$-chloroethyl)-phosphine; the dichloride, dibromide and diiodide of tri - (4 - bromophenyl) - phosphine; the dichloride, dibromide and diiodide of di - (chloromethyl)-phenylphosphine; the dichloride, dibromide and diiodide of diphenyl - (4 - hydroxy - 3,5 - di - tertiary - butylphenyl) - phosphine; the dichloride, dibromide and diiodide of 1 - butylphospholine - (3); the dichloride, dibromide, and diiodide of 1-phenyl-phospholine-(3).

These compounds are prepared in a simple manner by known processes by the addition of chlorine, bromine or iodine to tertiary phosphines $$R_3P + X_2 \rightarrow R_3PX_2$$

or by addition of alkyl halides to monohalogen phosphines $$R_2PX + RX \rightarrow R_3PX_2$$

and they are usually solid, crystalline compounds. Of the tertiary phosphine dihalides, it is preferred to use the phosphine diiodides because they are particularly effective and stable.

Tertiary phosphine dihalides are advantageously added in quantities of 0.001 to 5.0% by weight, preferably 0.01 to 1.0% by weight, based on the polyamide.

Suitable copper compounds are the salts of inorganic acids, for example $Cu(II)Cl_2$, $Cu(I)Cl$, $Cu(II)Br_2$, $Cu(I)Br$, $Cu(I)I$, $Cu(I)CN$ and $Cu(II)SO_4$, the salts of organic carboxylic acids, for example Cu acetate, Cu stearate and Cu benzoate, the salts of monovalent or polyvalent phenols, and also the complex compounds of such copper salts with ammonia, amines, amides, lactams, phosphites, phosphines and cyanides.

The copper compounds are advantageously added in such an amount that the polyamide contains 0.0001 to 0.2, preferably 0.001 to 0.02% by weight, based on the polyamide, of copper.

The stabilisers may be added to the polyamide-forming starting mixture before polymerisation or polycondensation, and the polymerisation may then be carried out in known manner either continuously or intermittently.

Alternatively, the stabilisers, either together or separately, or if desired in the form of a concentrate in the polyamide, may be mixed with the polyamide melt during or after polymerisation or polycondensation, using known mixing apparatus such as extruders, kneaders or stirrers.

Polyamides are here understood to mean polyamides which are formed by polymerisation of lactams or by polycondensation of diamines and dicarboxylic acids or amino carboxylic acids.

In addition to the stabilisers, the polyamides may also contain the usual additives such as pigments, dyes, light stabilisers, optical brightening agents, fillers, such as glass fibre or asbestos fibre, lubricants and mould parting agents, and plasticisers or crystallisation promoters.

The polyamides which have been stabilised according to the invention and which are particularly stabilised against damage by oxidation at elevated temperatures, are very suitable for the production of commercial silk for fishing nets, drive belts, conveyor bands, tyre cords and shaped articles which are subjected to heat treatment with free access of air or oxygen.

The following examples are to further illustrate the invention without limiting it.

EXAMPLE 1

1 kg. of a colourless polycaprolactam which has been prepared in the usual manner and which has a relative solution viscosity of 3.12 (measured on a 1% solution in m-cresol at 25° C.) is melted in a conventional screw extruder and at the same time homogeneously mixed with various stabilisers. The stabiliser containing polycaprolactam is spun into bristles of about 3 mm. diameter, chopped up into a granulate and dried. The granulate is then stored in a drying cupboard at 150° C. with free access of air, and the relative viscosity is measured after 144, 500 and 1,000 hours.

The experimental results are shown in Table 1. Experiments 7 to 9 are experiments carried out for comparison.

EXAMPLE 2

A mixture of 1.1 kg. of caprolactam, 35 g. of $\epsilon$-aminocaproic acid, 0.8 g. of acetic acid as chain breaking reagent and various stabilisers is polycondensed in an autoclave in the usual manner at a temperature of 270° C. The products obtained are spun as bristles of about 3 mm. diameter, chopped up into a granulate, freed from monomeric constituents by several hours' boiling with water, and dried. The colour and iodine content of the polyamides obtained are shown in Table 2. In addition, the granulate obtained is stored as in Example 1 in a drying cupboard at 150° C. with free access of air, and the relative solution viscosity (measured as in Example 1) is measured after 144, 500 and 1,000 hours. The results are again shown in Table 2.

Experiments 8 and 9 are comparison experiments.

TABLE I

| Serial No. | Cu-compound | P.p.m. Cu in the polyamide Mg. | P.p.m. Cu in the polyamide amide | Halogen compound | G. | Percent halogen in the polyamide | Colour of the polyamide | Relative solution viscosity Starting product | After 144 hr. | After 500 hr. | After 1,000 hr. |
|---|---|---|---|---|---|---|---|---|---|---|---|
| 1 | Cu(I)I·2triphenylphosphine. | 337 | 30 | Triphenylphosphine diiodide | 2.0 | 0.1 | Colourless | 3.10 | 3.92 | 3.38 | 2.94 |
| 2 | do | 337 | 30 | Tricyclohexylphosphine diiodide | 2.1 | 0.1 | do | 3.14 | 3.87 | 3.32 | 2.90 |
| 3 | do | 337 | 30 | Tributylphosphine diiodide | 1.8 | 0.1 | do | 3.11 | 3.90 | 3.32 | 2.91 |
| 4 | $K_3Cu(CN)_4$ | 250 | 60 | Tricyclohexylphosphine diiodide | 2.1 | 0.1 | do | 3.13 | 4.04 | 3.44 | 3.03 |
| 5 | Cu(I)I | 90 | 30 | do | 2.1 | 0.1 | do | 3.11 | 3.76 | 3.24 | 2.81 |
| 6 | Cu(II)acetate·$H_2O$ | 94 | 30 | do | 2.1 | 0.1 | do | 3.12 | 3.72 | 3.20 | 2.76 |
| 7 | do | 94 | 30 | KI | 1.3 | 0.1 | Greenish | 3.14 | 3.64 | 3.12 | 2.68 |
| 8 | Cu(I)I | 90 | 30 | Iodine | 1.0 | 0.1 | Greyish brown. | 3.12 | 3.60 | 3.10 | 2.65 |
| 9 | $K_3Cu(CN)_4$ | 250 | 60 | | | | Colourless | 3.10 | 3.36 | 2.90 | 2.41 |

TABLE II

| Serial No. | Cu-compound | Mg. | Cu content of the polyamide, p.p.m. | Halogen compound | G. | Corresponding to p.p.m. halogen in the polyamide | Colour of the polyamide | Halogen content of the polyamide (determined analytically) | Relative solution viscosity | | | |
|---|---|---|---|---|---|---|---|---|---|---|---|---|
| | | | | | | | | | Starting material | After 144 hr. | After 500 hr. | After 1,000 hr. |
| 1 | Cu(I)I·2 triphenylphosphine. | 337 | 30 | Triphenylphosphinediiodide. | 2.0 | 1,000 | Colourless | 740 | 2.78 | 3.16 | 2.88 | 2.52 |
| 2 | do | 337 | 30 | Triphenylphosphinedibromide. | 2.6 | 1,000 | do | 700 | 2.76 | 3.11 | 2.77 | 2.42 |
| 3 | do | 337 | 30 | Tricyclohexylphosphinediiodide. | 2.1 | 1,000 | do | 920 | 2.80 | 3.26 | 2.95 | 2.58 |
| 4 | do | 337 | 30 | Tributylphosphinediiodide. | 1.8 | 1,000 | do | 720 | 2.77 | 3.20 | 2.89 | 2.56 |
| 5 | Cu(I)I | 90 | 30 | Tricyclohexylphosphinediiodide. | 2.1 | 1,000 | do | 900 | 2.76 | 3.23 | 2.93 | 2.60 |
| 6 | Cu(II)acetate·H₂O. | 94 | 30 | Triphenylphosphinediiodide. | 2.0 | 1,000 | do | 730 | 2.74 | 3.15 | 2.86 | 2.53 |
| 7 | do | 94 | 30 | Tributylphosphinediiodide. | 1.8 | 1,000 | do | 750 | 2.78 | 3.18 | 2.88 | 2.53 |
| 8 | do | 94 | 30 | KI | 1.3 | 1,000 | Greenish | <100 | 2.80 | 2.78 | 2.41 | 2.16 |
| 9 | Cu(I)I·2 triphenylphosphine. | 337 | 30 | Iodine | 1.0 | 1,000 | Brown | 400 | 2.78 | 2.94 | 2.60 | 2.24 |

What we claim is:

1. A polyamide, stabilized against degradation by heat and oxidative effects, containing as stabilizer a combination consisting of
    (a) a copper compound selected from the group consisting of salts of inorganic acids, salts of organic carboxylic acids, salts of monovalent phenols, salts of polyvalent phenols, and the complex compounds of such copper salts with ammonia, amines, amides, lactams, phosphites, phosphines, and cyanides, in such an amount that 0.0001 to 0.2% by weight, based on the polyamide, of copper are present and
    (b) 0.001 to 5.0% by weight, based on the polyamide, of a tertiary phosphine dihalide
of the general formula

wherein $R_1$, $R_2$ and $R_3$, which may be different or not, represent substituted or unsubstituted alkyl, cycloalkyl, aryl or aralkyl radicals, or $R_1$ and $R_2$ together represent an alkylene radical and $R_3$ represents an alkyl, cycloalkyl, aryl or aralkyl radical, and X represents chlorine, bromine or iodine.

2. The polyamide of claim 1, said tertiary phosphine dihalide being a tertiary phosphine diiodide.

References Cited

UNITED STATES PATENTS

| | | | |
|---|---|---|---|
| 2,705,227 | 3/1955 | Stamatoff | 260—45.7 |
| 3,180,849 | 4/1965 | Thompson | 260—45.7 |
| 3,428,597 | 2/1969 | Dikotter et al. | 260—45.75 |

HOSEA E. TAYLOR, Primary Examiner

U.S. Cl. X.R.

260—37, 45.7